(12) United States Patent
Honma

(10) Patent No.: US 8,004,443 B2
(45) Date of Patent: Aug. 23, 2011

(54) INFORMATION READOUT APPARATUS AND INFORMATION REPRODUCING METHOD

(75) Inventor: Hiromi Honma, Tokyo (JP)

(73) Assignee: NEC Corporation, Tokyo (JP)

( * ) Notice: Subject to any disclaimer, the term of this patent is extended or adjusted under 35 U.S.C. 154(b) by 175 days.

(21) Appl. No.: 12/524,072

(22) PCT Filed: Jan. 7, 2008

(86) PCT No.: PCT/JP2008/050025
§ 371 (c)(1),
(2), (4) Date: Aug. 20, 2009

(87) PCT Pub. No.: WO2008/090750
PCT Pub. Date: Jul. 31, 2008

(65) Prior Publication Data
US 2010/0054716 A1  Mar. 4, 2010

(30) Foreign Application Priority Data
Jan. 23, 2007  (JP) .................. 2007-013000

(51) Int. Cl.
*H03M 1/12* (2006.01)
(52) U.S. Cl. .................. 341/155; 341/59; 369/59.22
(58) Field of Classification Search .......... 341/59, 341/155; 369/59.22
See application file for complete search history.

(56) References Cited

U.S. PATENT DOCUMENTS

| | | | | |
|---|---|---|---|---|
| 6,671,244 B2 * | 12/2003 | Honma | ........ | 369/59.22 |
| 6,674,592 B2 * | 1/2004 | Shimoda | ........ | 360/51 |
| 6,721,255 B1 * | 4/2004 | Gushima et al. | ........ | 369/59.12 |
| 6,845,075 B2 * | 1/2005 | Imai et al. | ........ | 369/59.22 |

FOREIGN PATENT DOCUMENTS

| | | |
|---|---|---|
| JP | 2001101799 A | 4/2001 |
| JP | 2003036612 A | 2/2003 |
| JP | 3688225 B | 6/2005 |
| JP | 2006004465 A | 1/2006 |
| JP | 2008010097 A | 1/2008 |

OTHER PUBLICATIONS

International Search Report for PCT/JP2008/050025 mailed Mar. 25, 2008.
K. Kayanuma et al., "Eight to Twelve Modulation Code for High Density Optical Disk", International Symposium on Optical Memory 2003, Technical Digest pp. 160-161, Nov. 3, 2003.
M. Ogawa et al., "Development of HD DVD drive technology (recording technology)", Institute of Image Information and Television Engineers Technical Report, ITE Technical Report, vol. 28, No. 43, pp. 17-20 MMS2004-38, CE2004-39 (Jul. 2004).
S. Saito et al., "Base of Today's Information Communication", Ohmasha Ltd., Dec. 20, 1992, p. 212-217.

* cited by examiner

*Primary Examiner* — Khai M Nguyen

(57) ABSTRACT

An information readout apparatus includes analog to digital converting means, equalizing means, interpolating means, maximum likelihood detecting means and PLL means. The analog to digital converting means converts a read signal read out from an optical disc medium, on which data is recorded with run length limited code that the shortest run length is 1, into a digital signal, and outputs the digital signal in synchronous with a first clock signal with a frequency which is N/M times of a channel frequency. At this time, N is an integer equal to or more than 2 and M is an integer meeting N/M>0.5. The equalizing means equalizes said digital signal to a previously specified partial response (PR) characteristic in synchronous with said first clock signal signal. The interpolating means converts N input data outputted from said equalizing means into M output data, and outputs output data in synchronous with a second clock signal with a frequency of 1/M times of the channel frequency. The maximum likelihood detecting means converts the output data outputted from said interpolation means into an M-bit detection data, and outputs said detection data in synchronous with said second clock signal signal. The PLL means generates said first clock signal and said second clock signal based on said read signal.

17 Claims, 14 Drawing Sheets

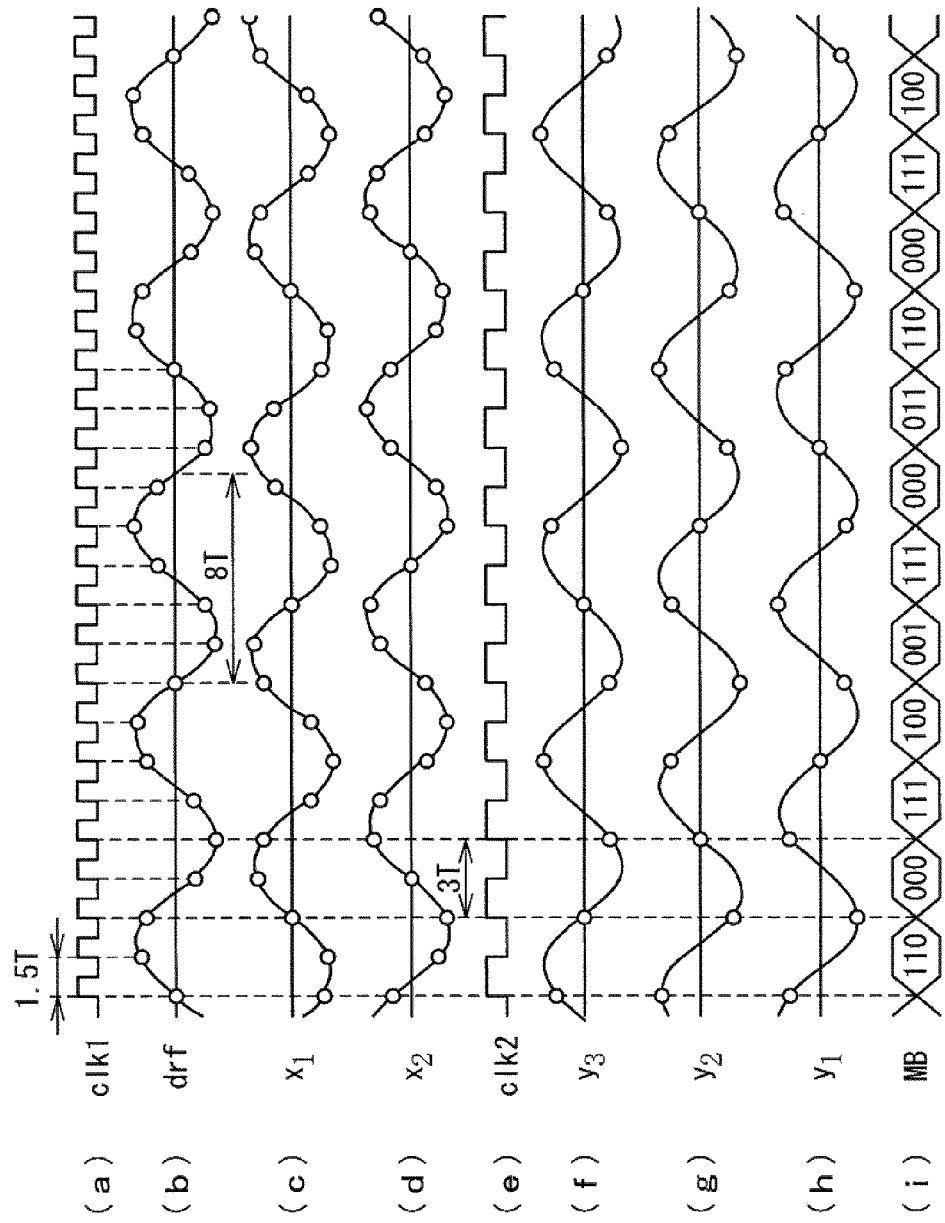

INFORMATION READOUT APPARATUS AND INFORMATION REPRODUCING METHOD

This patent application is the National Phase of PCT/JP2008/050025, filed Jan. 7. 2008, which claims a priority based on Japanese Patent Application No. 2007-13000 filed Jan. 23 2007. The disclosure thereof is incorporated herein by reference.

TECHNICAL FIELD

The present invention relates to an information readout apparatus such, as an optical disc and so on, and an information reproducing method, and more particularly relates to an information readout apparatus for detecting the maximum likelihood of information recorded in a high recording density.

BACKGROUND ART

In accompany with the advancement of multimedia technology in recent years, a large quantity of information including a picture data is required to be processed. Moreover, a larger capacity of a storage unit for recording the information is required. In particular, in the storage field of the video data of a high image quality, a more storage capacity than a current DVD (Digital Versatile Disc) is desired. However, in order to increase the storage capacity of an optical disc apparatus or hard disc apparatus, a record density is required to be increased. In association with this necessity, the reduction in an error rate and the reservation of reliability become the important subjects. For such subjects, the optical disc is roughly considered in the direction of three kinds such as a medium composition approach, an optical approach and a signal processing approach. Mainly, the signal processing approach will be described below.

An optical disc apparatus detects information from brightness or polarization of a reflection light by emitting a laser beam collected by optical elements onto a disc medium. The collected beam spot is definite. As its diameter is smaller, the recording/reproducing of a higher density is possible. For this reason, the optical approach for decreasing the beam spot is advanced. The spot diameter is inversely proportional to a natural aperture NA of an objective lens and proportional to a laser beam wavelength ●. Thus, when the natural number NA is increased and the wavelength ● is decreased, the spot diameter can be made small. However, when the natural number NA is increased, a focal depth is made shallow, and a distance between a disc plane and a lens is required to be made short, which results in a limit. Also, the short wavelength laser has the subjects of the stability of a high output, oscillation, a long life and the like. However, the shorter wavelength is gradually advanced, such as an infrared laser (●=780 nm) in CD (Compact Disc), a red laser (●=650 nm) in DVD, and a blue laser (●=405 nm) in a next generation DVD.

A transmission path frequency property between an optical head and the disc medium exhibits the shape of a LPF (Low-Pass Filter) in which the definite beam spot causes reduction of gain in a high frequency region. Thus, even if a rectangular wave is recorded, its waveform is made dull. If the record density is made high, the waveform to be read at a particular time interferes with the waveform of a different time. This is referred to as an inter-code interference. With the inter-code interference, it becomes difficult to reproduce a record mark shorter than a certain length. On the contrary, if the record mark is long, a reduction in the phase data output, frequency for synchronization clock extraction causes it to be out of synchronization. Thus, the record mark is required to be limited to the certain length.

From the above reasons, as approach of signal processing, data to be recorded onto the optical disc is coded. In particular, an RLL code (Run Length Limited Code) in which an inversion distance of a code is limited is used in many cases. An ETM (Eight to Twelve Modulation) code, an EFM (Eight to Fourteen Modulation) code, a (1,7) RLL code, an 8/16 modulation code and the like are used. Among them, the shortest run length in the EFM code used in CD and the 8/16 modulation code employed in DVD is 2 (d=2). The shortest, run length in the (1,7) RLL and ETM codes is 1. The ETM is (1,1,0) RLL code, as described in "Eight to Twelve Modulation Code for High Density Optical Disk" (International Symposium on Optical Memory 2003, Technical Digest pp. 160-161, Nov. 3, 2003) by Kinji Kayanuma, et al. The coding rate of the ETM code is 2/3 similarly to the (1,7) RLL code. There are the features in the limit of the continuous number of the shortest, marks and the DC component compression performance.

Also, there is a technique referred to as waveform equalization. This technique reduces an error rate by inserting an inversion filter for removing the inter-code interference. The waveform equalization can suppress the inter-code interference, by emphasizing a high frequency component of a readout signal. However, this technique also emphasizes a high frequency component of noise. Thus, there is a case that the waveform equalization degrades SNR (Signal to Noise Ratio) of the readout signal. In particular, when a record density is high, the degradation in the SNR due to the waveform equalization results in a main factor of error in data detection. A PR (Partial Response) equalization is one method of the waveform equalization that intentionally generates a known inter-code interference. The PR equalization can suppress the degradation in SNR, because the high frequency component is not usually emphasized.

On the other hand, as an effective detecting method, there is a maximum likelihood detecting system. This method is a method for improving the detection performance by selecting a pattern, in which a root mean square value of errors is the smallest, from all of possible time-series patterns in which it is known that a state transition occurs. However, it is difficult to perform the above process on an actual circuit, because of a circuit scale and an operation speed. Thus, this is usually attained by using an algorism referred to as a Viterbi algorism and recurrently selecting a path. This detecting method is referred to as the Viterbi detection.

A detecting method in which the Viterbi detection is combined with the PR equalization is referred to as a PRML (Partial Response Maximum Likelihood) method, and while a kind of error correction is carried out, data can be detected. In the PR equalisation, a readout signal has a correlation in a temporal direction. For this reason, only a particular state transition appears in a data sequence obtained by sampling the readout signal. It is possible to reduce the error of the detection data by comparing a limited state transition and the data sequence of the actual readout signal including noise and selecting the most probable state transition. The PRML detection method that uses the ETM code and a PR (1,2,2,2,1) channel is described in "Development of HD DVD Apparatus Technique (Recording Technique)" (Information Media Academy Technique Report ITS Technical Report Vol. 28, No. 43, PP. 17-20 MMS2004-38, CE2004-39 (July 2004)) by Ogawa, Honma et al. According to this technique, it is possible to attain a wide detection margin at a time of a high density recording/reproducing In order to improve the detection performance by performing the Viterbi detection, the frequency characteristic of a reproduction channel needs to coincide with a particular PR equalisation characteristic. In such a case, the PR equalization characteristic as close as possible to the reproduction channel is selected. However, the frequency characteristic is typically corrected by a waveform equalizer and made as equal as possible to a predetermined PR characteristic.

As a technique for adaptively correcting aging degradation in a signal and improving the detection performance, there is an automatic equalization or an adaptive equalization. Although adaptive equalisation algorism of a sequential type is described in "Base of Today's Information Communication" (Ohmsha Ltd, Dec. 20, 1992 pp. 212-217) by Shuzo Saito et al. In particularly, a Zero Forcing method, a Mean Square method and the like are typical. The adaptive equalization technique has great effect making it possible not to necessitate of initial adjustment of the apparatus.

Since an amplitude data is used in the PRML, an AD converter having the data width of 8 bits or so on and operating in a channel clock is required. Also, when an equalizer for equalization to the PR channel is formed from an FIR (Finite Impulse Response) filter, the FIR filter needs to have about ten stages of multipliers and an adder. Moreover, a tap coefficient controller is required to contain correlation units for tap coefficients of the FIR filter.

However, the operation speed of a reproducing circuit system is made faster in accordance with a request of a high magnification speed reproduction. In order to improve an operation speed of the AD converter, the circuit scale becomes large, and a power consumption amount simultaneously increases. Also, in order to operate the FIR filter faster, the scale of the multiplier circuit becomes large, and the power consumption amount also increases. Moreover, in order to operate the tap coefficient controller fast, the circuit scales of a multiplier and an integrator in the correlation unit become large, and their power consumption amounts also increase.

Thus, the high magnification speed reproduction involves the increase in the circuit scale and the power consumption amount. Occasionally, a case that the Viterbi detecting section cannot operate is considered. This results in a serious demerit in case of installation in note type personal computer or the like that is used under a battery drive.

One method to solve the foregoing problems is disclosed in Japanese Patent No. 3,688,225. FIG. 1 is a block diagram showing a configuration of a digital data readout apparatus. The digital data readout apparatus of this type contains a pickup 101, a preamplifier 102, a waveform equalizer 103, an AD converter (Analog-to-Digital Converter) 104, an offset control section 105 for half rate processing, a phase error data detecting section 108 for half rate processing, a loop filter 109, a clock generating section 110, an adaptive equalizing section 106 for half rate processing and a maximum likelihood decoding section 107 for half rate processing.

An optical recording medium 100 digitally records record data with record code that has a constraint in which there are at least three or more continuous same codes ($d \geq 2$). In the digital data readout apparatus, at first, a readout signal is obtained by performing sampling by the AD converter 104 which uses a sampling clock signal having a frequency equal to a half of a channel bit frequency from the optical recording medium 100. The half rate processing offset control section 105 carries out an offset correction control while interpolating the readout signal in a default time. The half rate processing phase error data detecting section 108 performs a phase synchronization control on the readout signal obtained by the half rate processing offset control section 105, while interpolating a phase error data in the default time. Simultaneously, the half rate processing adaptive equalizing section 106 performs a partial response adaption equalisation on the readout signal obtained by the half rate processing offset control section 105. Then, the half rate processing maximum likelihood decoding section 107 uses the partial response adaptive equalization signal obtained by the half rate processing adaptive equalizing section 106 and carries out the decoding on the basis of a type of partial response.

Specifically, a circuit system can operate at a frequency equal to a half of the conventional case, and the power consumption amount can be largely decreased without any reduction in reproduction performance. However, this method can be used for only CD and DVD in which the shortest run length of the record code is 2. When the code whose shortest run length is 1 is used, the frequency band of the readout signal is extended up to a high frequency region. Thus, when the sampling is carried out at the half rate, the necessary band cannot be reserved. Therefore, the influence of aliasing leads to the reproduction performance reduction. The code whose shortest run length is 1 is used in the next generation optical disc of the DVD in which a blue laser is used. Also, there is a standard in which the PRML detection is assumed, and the channel rate is very high.

Also, Japanese Patent Application Publication (JP-P2001-101799A) discloses a digital readout signal processing apparatus for determining a digital record data from an analog readout signal that is read from a recording medium by a reading head. The digital readout signal processing apparatus contains an AD converter, an equalizing circuit, an interpolator and a determining unit. The AD converter samples the analog readout signal in a period longer than a digital record channel rate at least and converts into a low rate digital readout signal of a period longer than the digital record channel rate. The equalizing circuit digitally filters the low rate digital readout signal at an original low rate and generates a digital equalization signal. The interpolator interpolates reproduction data of the digital record channel rate from the digital equalization signal. The determining unit derives the recorded data from the interpolated data column. The sampling in the AD converter is carried out at a half rate that is a frequency equal to a half of the record channel rate. The interpolator carries out a half rate Nyquist interpolation whose band is limited to the Nyquist frequency of the half rate.

DISCLOSURE OF INVENTION

An objective of the present invention is to provide an information readout apparatus and an information reproducing method that can carry out a high magnification speed reproduction without any reduction in a reproduction performance. Another objective of the present invention is to provide an information readout apparatus and an information reproducing method that decrease a circuit scale and a power consumption amount without any reduction in the reproduction performance.

In an aspect of the present invention, the information readout apparatus contains; an analog-to-digital converting section, an equalizing section, an interpolating section, a maximum likelihood detecting section and a PLL section. An optical disc medium records data by using a run length limit code whose shortest run length is 1. The analog-to-digital converting section converts a read signal read from the optical disc medium into a digital signal and outputs in synchronization with a first, clock signal of a frequency equal to N/M times of the channel frequency included in the read signal. At this time, the value N is defined as an integer of 2 or more, and the value M is defined as an integer satisfying N/M>0.5. The equalising section equalizes the digital signal to a previously specified partial response characteristic in synchronization with the first clock signal. The interpolating section converts into M output data in accordance with N input data outputted by the equalizing section and outputs the output data in synchronization with a second clock signal of a frequency equal to 1/M times of the channel frequency. The maximum likelihood detecting section converts into an M-bit detection data in accordance with the output, data outputted by the interpolating section and outputs the detection data in synchronization with the second clock signal. The PLL section generates the first clock signal and the second clock signal in accordance with the read signal.

In another aspect of the present invention, the information readout apparatus contains an analog-to-digital converting section, a PLL section, an equalising section, an interpolating section, a maximum likelihood detecting section and an information detecting section. Here, N1 is defined as an integer of 2 or more, M1 is defined as an integer satisfying N1/M1>0.5, N2 is defined as an integer of 1 or more, and M2 is defined as an integer satisfying N2<M2 and N2×M1<M2×N. The analog-to-digital converting section converts a read signal, which is recorded in accordance with the run length limit code and read from the optical disc medium, into a digital signal and outputs the digital signal in synchronisation with a sampling clock signal. The PLL section generates a first clock signal, a second clock signal, a third clock signal and a fourth clock signal in accordance with the digital signal. A frequency of the first clock signal is assumed to be N1/M1 times of the channel frequency of the read signal. A frequency of the second clock signal is assumed to 1/M1 times of the channel frequency. A frequency of the third clock signal is assumed to be N2/M2 times of the channel frequency. A frequency of the fourth clock signal is assumed to be 1/M2 times of the channel frequency. The sampling clock signal is the first clock signal when the read signal is read from the optical disc medium in which it is recorded in the run length limit code whose shortest run length is 1, and the sampling clock signal is the third clock signal when the read signal is read from the optical disc medium in which it is recorded in the run length limit code whose shortest run length is 2. The equalizing section outputs an equalization signal, in which the digital signal is equalized to the pre-specified partial response characteristic, in synchronization with the sampling clock signal. The interpolating section inputs the equalization signal in an N1 phase parallel and interpolates to an interpolation signal for each period of the channel frequency and outputs to an M1 phase parallel. The interpolation signal is outputted in synchronization with the second clock signal. The maximum likelihood detecting section selects a probable state transition in accordance with the interpolation signal and detects a first data sequence and then outputs the first data sequence as the detection data for each period of the second clock signal in an M1 bit parallel. The data detecting section receives the equalization signal in an N2 phase parallel and detects a second data sequence and then outputs the second data sequence as the detection data for each period of the fourth clock signal in an M2 bit parallel.

Also, in another aspect of the present invention, the information readout apparatus contains an analog-to-digital converting section, an interpolating section and a maximum likelihood detecting section. Here, N is defined as an integer of 2 or more, and M is defined as an integer satisfying N/M>0.5. The optical disc medium records data by using the run length limit code whose shortest run length is 1. The analog digital converting section converts the read signal, which is reproduced from the optical disc medium and includes a data sequence having a limited state transition, into a digital signal and generates an input data sequence. The interpolating section carries out interpolation in accordance with the N input data in the input data sequence and outputs the M interpolation data. The maximum likelihood detecting section selects the probable state transition in accordance with the interpolation data and detects the data sequence.

Moreover, in another aspect of the present invention, the information reproducing method contains a digital converting step, an equalizing step, an interpolating step, a maximum likelihood detecting step and a clock signal generating step. Here, N is defined as an integer of 2 or more, and M is defined as an integer satisfying N/M>0.5. The digital converting step includes the step of converting the read signal, which is recorded in accordance with the run length limit code whose shortest run length is 1 and read from the optical disc medium, into the digital signal and outputting in synchronization with the first clock signal of the frequency equal to N/M times of the channel frequency of the read signal. The equalising step includes the step of equalizing the digital signal to the pre-specified partial response characteristic in synchronization with the first clock signal. The interpolating step includes the step of converting into the M output data in accordance with the N input data calculated at the equalizing step and outputting the output data in synchronization with the second clock signal of the frequency equal to 1/M times of the channel frequency. The maximum likelihood detecting step includes the step of converting into the M-bit detection data in accordance with the output data outputted at the interpolating step and outputting the detection data in synchronization with the second clock signal. The clock signal generating step includes the step of generating the first clock signal and the second clock signal in accordance with the read signal.

According to the present invention, it is possible to provide the information readout apparatus and the information reproducing method that can carry out a high magnification speed reproduction without any reduction in the reproduction performance, even if the shortest run length of the record code is 1. Also, according to the present invention, it is possible to provide the information readout apparatus and the information reproducing method that reduce the circuit scale and the power consumption amount without any reduction in the reproduction performance. Moreover, according to the present invention, it is possible to provide the information readout apparatus and the information reproducing method that make the convergence of the adaptive equalizing means fast.

BRIEF DESCRIPTION OF DRAWINGS

The objects, effects and features of the present invention would be more evident from the description of the exemplary embodiments in conjunction with the attached drawings:

FIG. 14 shows waveforms at the operations of the reproduction data detecting section.

BEST MODE FOR CARRYING OUT THE INVENTION

Hereinafter, the present invention will be described in detail with reference to the attached drawings. At first, the principle of the present invention will be simply described. According to the sampling theory, when a signal is sampled at a sampling frequency fs, a band between DC and a Nyquist frequency fn (a half of the sampling frequency fs, fn=fs/2) can be recovered. However, a frequency region higher than the Nyquist frequency is superimposed on information after the sampling, as return noise (aliasing). Thus, the reproduction performance is degraded.

Figure 1:
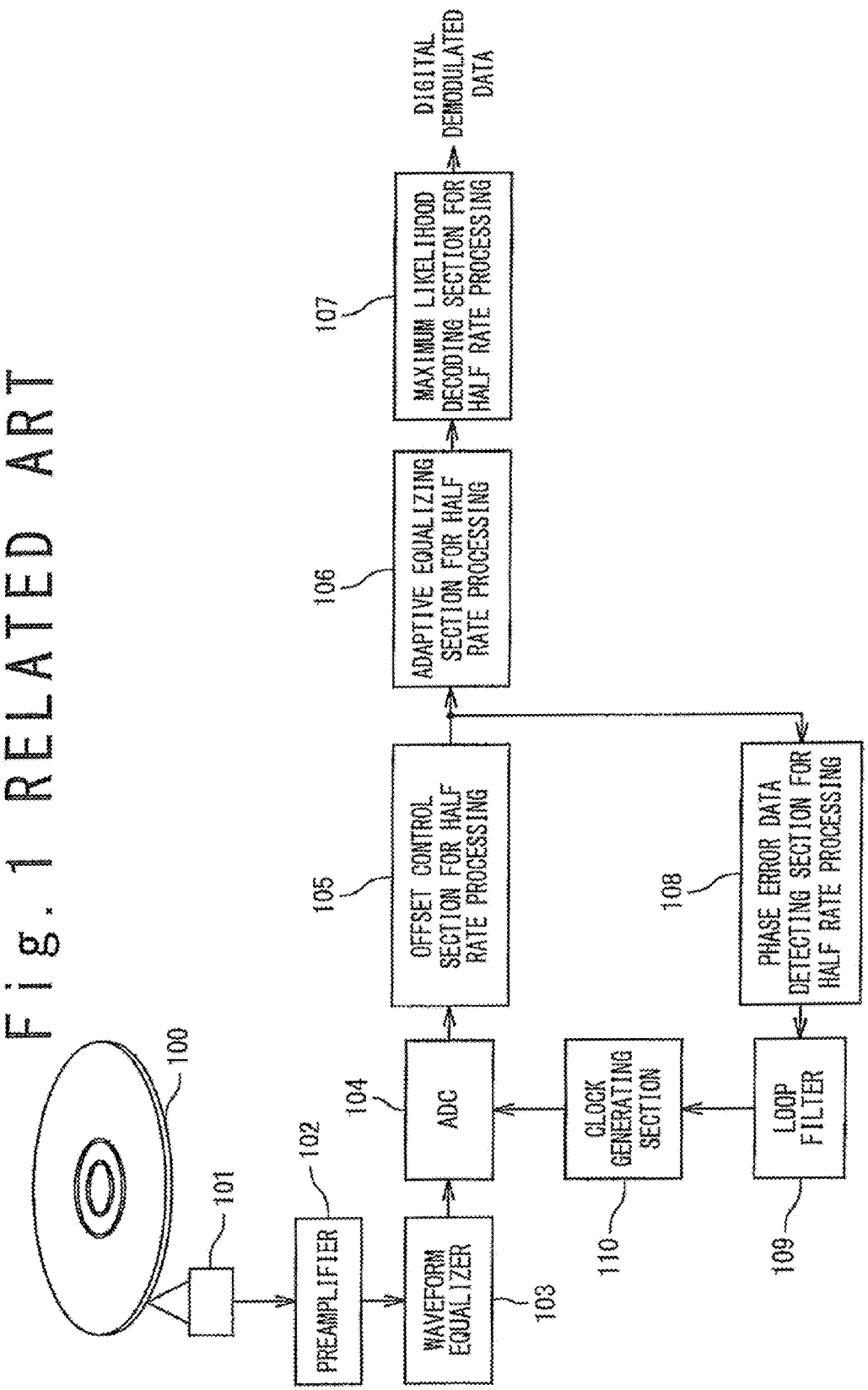
FIG. 1 is a block diagram showing the configuration of a conventional digital data readout apparatus of a half rate detecting system.
Figure 2:
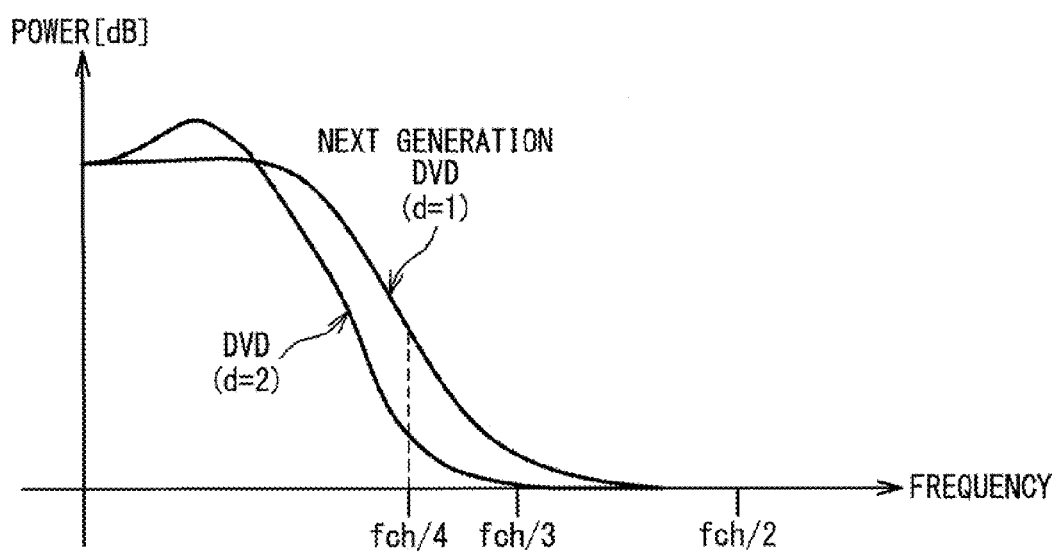
FIG. 2 is a diagram showing frequency spectra of readout signals of DVD and a next generation DVD.
Figure 3:
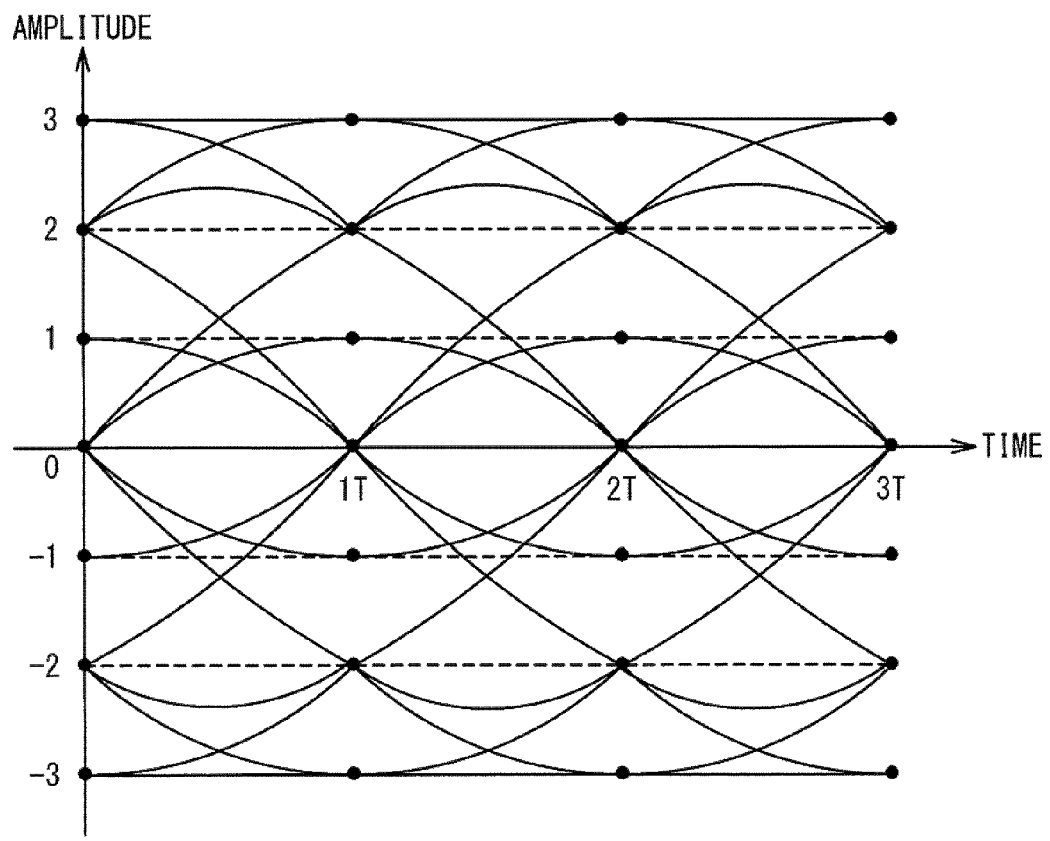
FIG. 3 is an eye pattern view of an RLL code of a run length d=1, and a PR (1,2,2,1) channel (1T Sample)

FIG. 2 is a diagram showing frequency properties of a readout signal of a DVD in which the RLL code of the shortest run length d="2" is used and a readout signal of the next generation DVD in which the RLL code that, the shortest run length d="1" is used. Even if the readout signal of the DVD is sampled at 1/2 of a channel frequency fch, there is little signal degradation since a gain is close to 0 in the band of 1/4 or more of the channel frequency fch. However, since the RLL code of d=1 is used in the next generation DVD, the gain is not reduced to an ignorable level in the vicinity of fch/4. Therefore, when the sampling is carried out at fch/2, it is apparent that an originally necessary band cannot be only reproduced, but also the signal is degraded due to the influence of the aliasing so that the reproduction performance is reduced. However, when the sampling frequency is slightly increased to fch(2/3) (the Nyquist frequency is set to fch/3), it could be understood that the performance degradation is ignorable.

Figure 4:
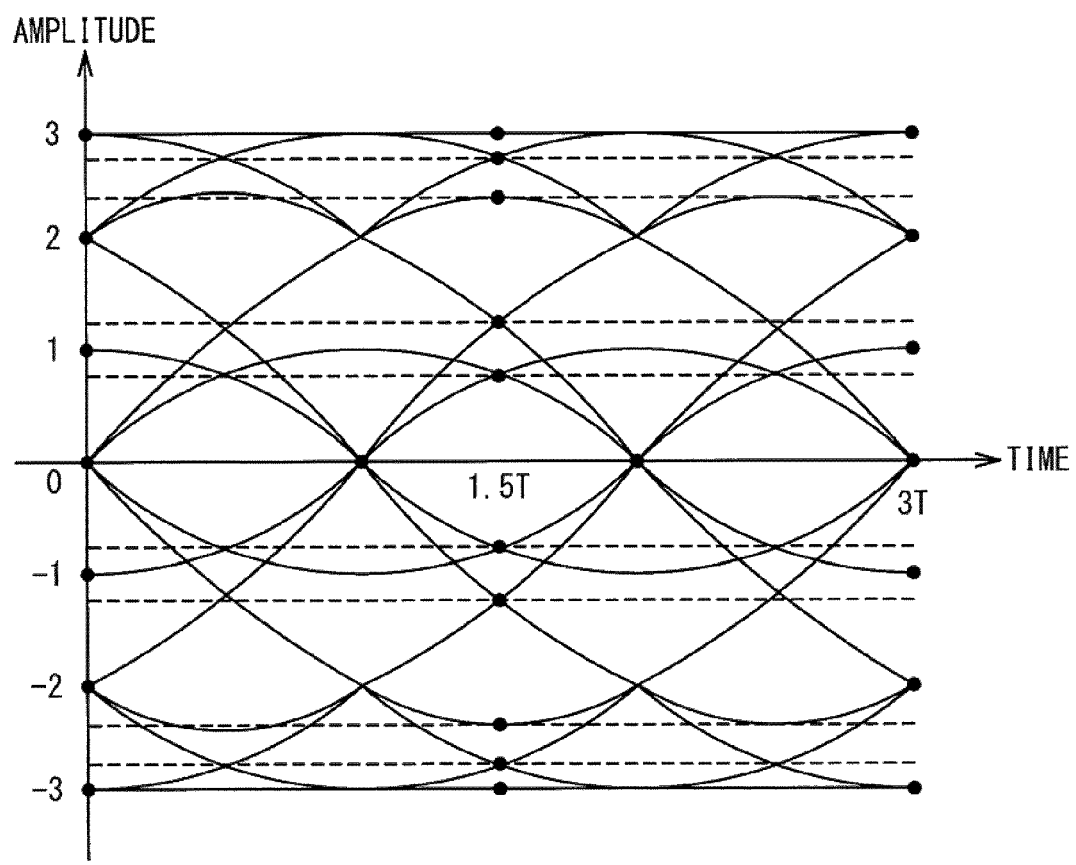
FIG. 4 is an eye pattern view of an RLL code of a run length d=1, and a PR (1,2,2,1) channel (1.5T Sample)

By the way, when data is recorded by using the RLL code of the shortest run length d=1 and then is reproduced, signals are distributed over 7 reference levels in 1T unit (T is a channel clock period) if the PR (1,2,2,1) equalisation is carried out. However, when the sampling is carried out at fch(2/3), namely, in 1.5T unit, as shown in FIG. 4, signals are distributed over 15 reference levels, and a state transition rule becomes very complicated. This implies that the circuit scale of the maximum likelihood detecting section increases, which violates the original object of the present invention.

Figure 5:
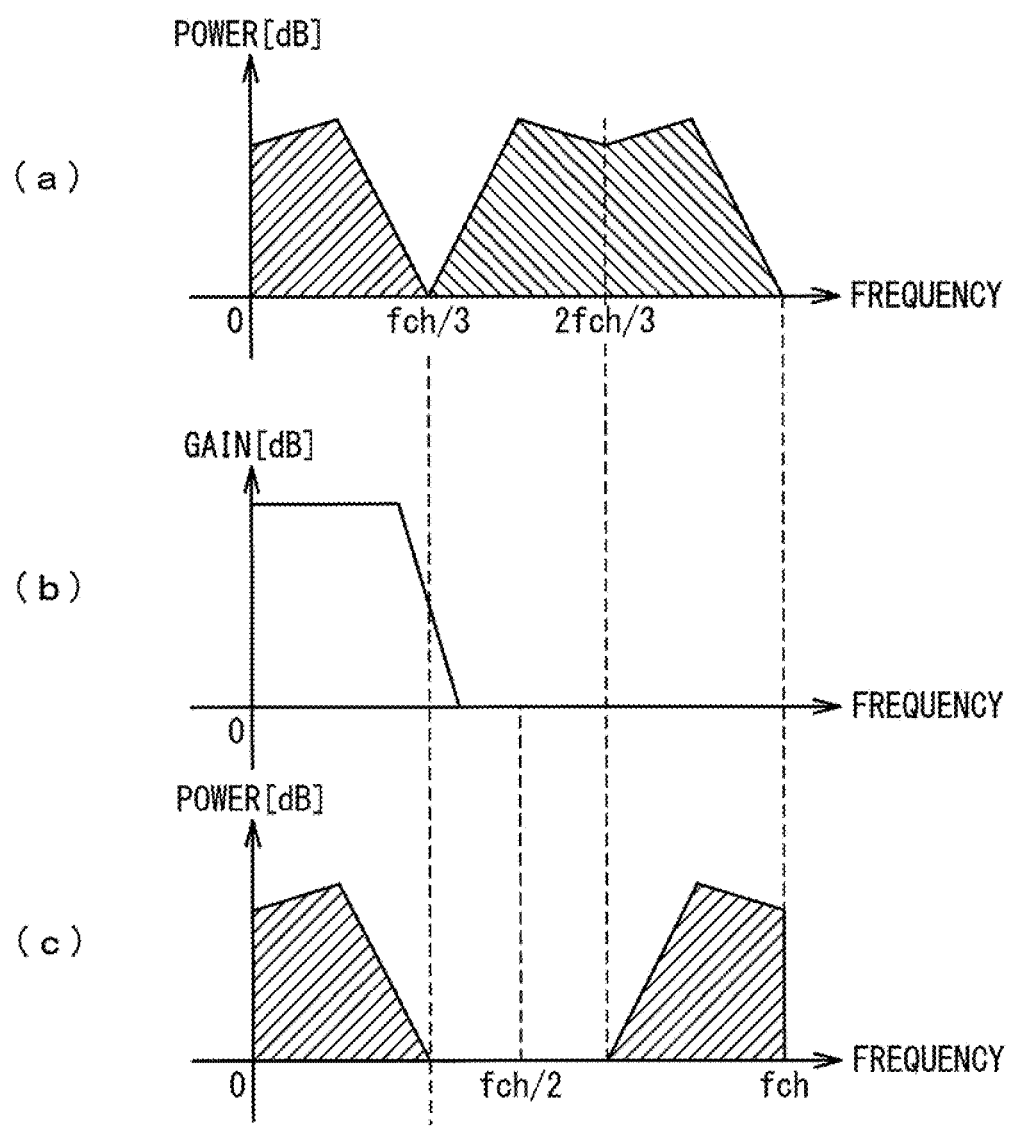
FIG. 5 is a diagram showing an aliasing and an interpolator frequency characteristic.

For this reason, a process to an equalizing section is executed in 1.5T unit, and the maximum likelihood detection is carried out after data in 1T unit is re-generated from an output of the equalizing section in 1.5T unit by an interpolating section. A spectrum of 1.5T-sampling data is symmetrical with respect to a Nyquist frequency fch/3, as shown in (a) of FIG. 5. A spectrum of 1T-sampling data is symmetrical with respect to fch/2, originally as shown in (c) of FIG. 5. Thus, on the spectrum shown in (a) of FIG. 5, it is required that the gain of the frequency band of fch/3 or more is reduced. In order to suppress the influence of the aliasing, a LPF (Low Pass Filter) for removing the frequency band of fch/3 or more is desirably provided inside the interpolating section, as shown in (b) of FIG. 5. In this way, without any performance degradation, it becomes possible to operate an AD converting section and the equalizing section at a frequency lower than the channel frequency.

Figure 6:
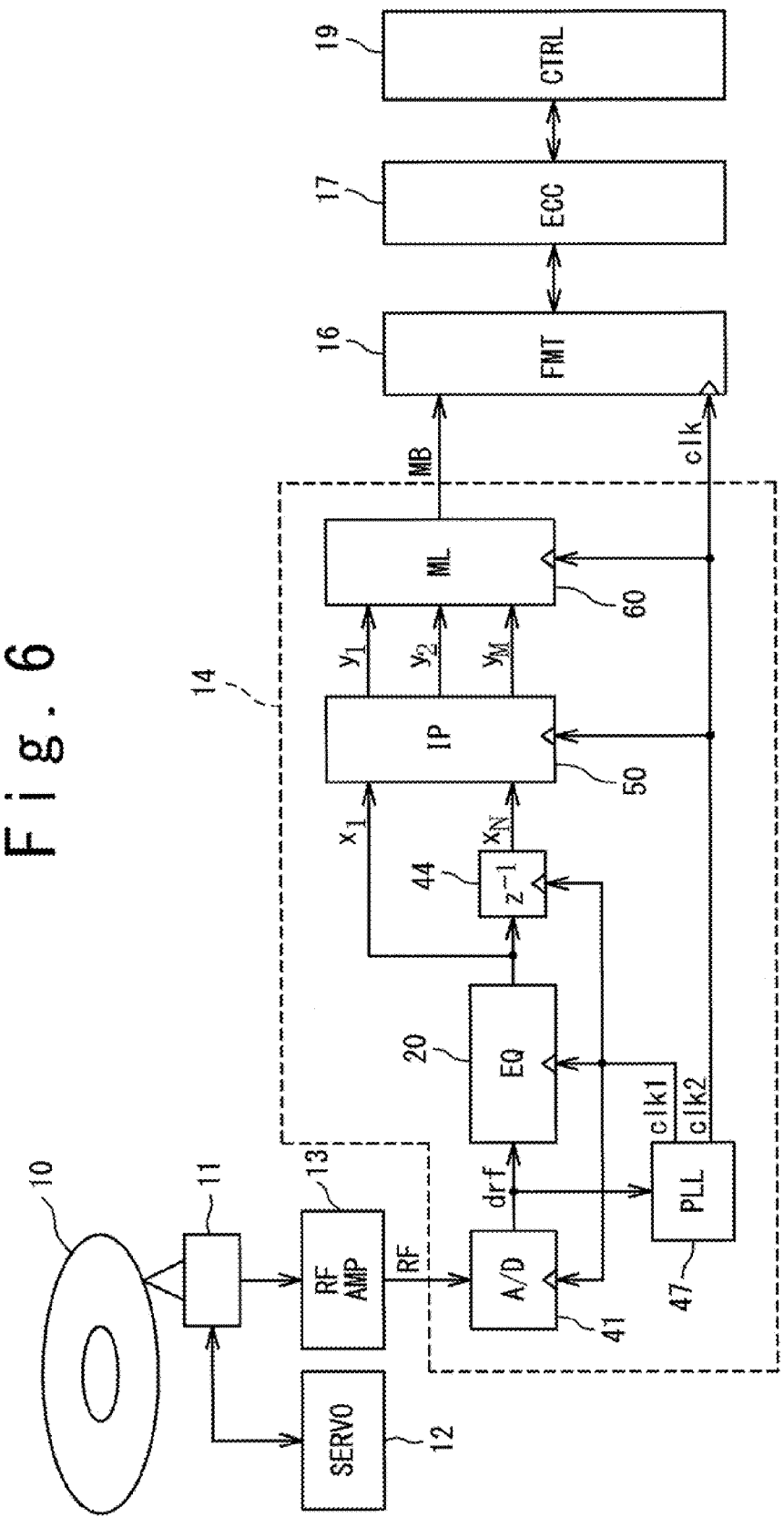
FIG. 6 is a block diagram showing a configuration of an information readout apparatus according to an exemplary embodiment of the present invention.

As shown in FIG. 6, the information readout apparatus according to the exemplary embodiment of the present invention includes a pickup 11, an actuator servo mechanism 12, a preamplifier (RF AMP) 13, a reproduction data detecting section 14, a formatter (FMT) 16, an ECC demodulating section (ECC) 17 and a system control section (CTRL) 19.

An optical disc medium 10 is recorded with data modulated in the RLL code of the shortest run length d=1. The information readout apparatus reads the data as an analog signal from the optical disc medium 10 by the pickup 11. The modulation code may be an EFM code of the shortest run length d=2 or an 8/16 modulation code. A light beam, which is irradiated onto the record surface of the optical disc medium 10 by the pickup 11, is accurately positioned in a focus direction and a tracking direction by the actuator servo mechanism 12. A read signal read by the pickup 11 is amplified by the preamplifier 13, and subjected to a high frequency region boosting equalization and a band limiting process by an analog filter (not shown), and then is supplied to the reproduction data detecting section 14.

The reproduction data detecting section 14 contains an AD converting section (A/D) 41, an equalizing section (EQ) 20, a delay section ($Z^{-1}$) 44, an interpolating section (IP) 50, a maximum likelihood detecting section (ML) 60 and a PLL (Phase-Locked Loop) section 47.

The read signal whose band has been limited is digitized by the AD converting section 41. The sampling clock signal of the AD converting section 41 is generated by the PLL section 47. The output of the AD converting section 41 is supplied to the equalizing section 20. The equalizing section 20 executes an equalizing process so that the output of the AD converting section 41 is equalized to the PR (1,2,2,1) channel before the input to a Viterbi detecting section 60. The output of the equalizing section 20 is supplied to the interpolating section 50.

The interpolating section 50 generates an M-phase data sequence through the interpolation from an N-phase data sequence. The M-phase data sequence outputted from the interpolating section 50 is supplied to the Viterbi detecting section 60 that is the maximum likelihood detecting section. In FIG. 6, M=3, namely, a 3-phase data sequence is generated and outputted. The Viterbi detecting section 60 outputs an M-bit detection data MB in synchronization with the clock signal of the frequency fch/M.

For the Viterbi detection data outputted from the Viterbi detecting section 60, the formatter 16 removes a frame sync pattern and performs an RLL demodulation and the like thereon. The demodulated data is used as a user data through the system control section 19 after an error correcting process is executed by the ECC demodulating section 17.

The operation clock signal of the reproduction data detecting section 14 will be described below. The PLL section 47 generates clock signals clk1 and clk2 in accordance with an output drf of the AD converting section 41. The clock signal clk1 is supplied to the AD converting section 41, the equalizing section 20 and the delay section 44. The clock signal clk2 is supplied to the interpolating section 50 and the Viterbi detecting section 60 that is the maximum likelihood detecting section.

The PLL section 47 may be formed from a digital circuit. Also, the perfect digital PLL configuration containing the digitalization of the input signal may be employed. For example, instead of the AD converting section 41, the digitalization may be carried out by a digitalizing section containing the AD converting section and the interpolating section and operating in synchronous with a system clock signal. In that case, the AD converting section executes a sampling process with the system clock signal of a fixed frequency that is higher than fch(N/M). After that, the interpolating section corrects the phase as if the sampling is carried out at an (N/M)-time synchronization clock signal. The digitalizing section may include a voltage controlled oscillator (VCO). In this case, the voltage controlled oscillator is controlled in response to a control signal for phase correction that is generated by the PLL section 47.

The sampling clock signal clk1 of the AD converting section 41 is defined as a synchronization clock signal of a frequency equal to (N/M)-time (N is an integer of 2 or more and M is an integer satisfying N/M>0.5) of the channel frequency fch, and the frequency of the clock signal clk2 is defined as a frequency equal to (1/M)-time of the channel frequency fch. In the RLL code of the shortest run length d=1, as mentioned above, when N/M=0.5 or less is set, the performance degradation cannot be ignored. Thus, N/M>0.5 is set. When an upper limit of the band of the readout signal is set to fmax, the values N and M are determined to be the minimum values satisfying fmax<fch(N/2M). However, when the value M becomes large, the circuit scales of the interpolating section 50 and the detecting section 60 increase, as described later. Thus, if is proper that the value M has the value of 4 or less. Thus, (N,M)=(2,3) is suitable. In the RLL code of the shortest run length d=2, as mentioned above, even if N/M=0.5, the signal degradation is rarely generated. Therefore, (N,M)=(1,2) is suitable.

The equalizing section 20 operates at fch(N/M) equal to the sampling frequency of the AD converting section 41. The output of the equalizing section 20 is converted into the N-phase data such as $x_i$, $x_i Z^{-1}$, ..., $x_i Z^{-N+1}$ by the delay section 44 or directly supplied to the interpolating section 50. FIG. 6 shows a case of N=2, namely, a 2-phase, and the delay section 44 is inserted as one stage.

The interpolating section 50 generates the M-phase data sequence through the interpolation from the N-phase data sequence in synchronization with a clock signal of the frequency fch/M. The M-phase data sequence is supplied from the interpolating section 50 to the Viterbi detecting section 60 that is the maximum likelihood detecting section. In FIG. 6, M=3, namely, a 3-phase data sequence is generated and outputted.

The Viterbi detecting section 60 outputs the M-bit detection data MB in synchronization with the clock signal of the frequency fch/M. The maximum likelihood detecting section may be used for the Viterbi detection. Also, it is possible to generate the clock signal of the frequency fch, sample or extract the output of the interpolating section 50 at the clock signal of the frequency fch, and operate the Viterbi detecting section 60 at the clock signal of the frequency fch. However, in this case, the Viterbi detecting section 60 has a defect that the faster operation is difficult because the addition, comparison and selection of pass metric values are required to be performed in one period of the clock signal of the frequency fch. The Viterbi detecting section 60 carries out the maximum likelihood detection operation while the M-phase data sequence is synchronous with the frequency fch/M, and outputs the M-bit information. Thus, a throughput becomes fch (bit/second).

Figure 7:
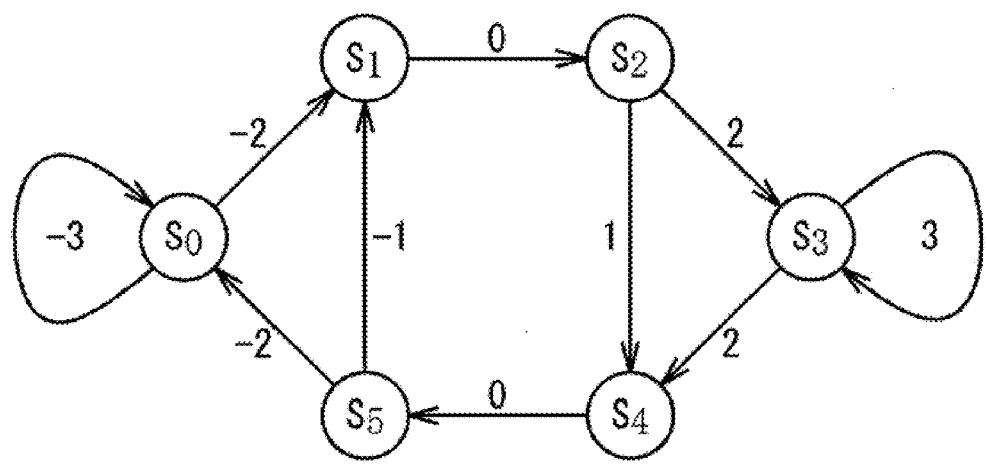
FIG. 7 is a state transition diagram for each 1T in a run length d=1 code, and PR (1,2,2,1) channel.
Figure 8:
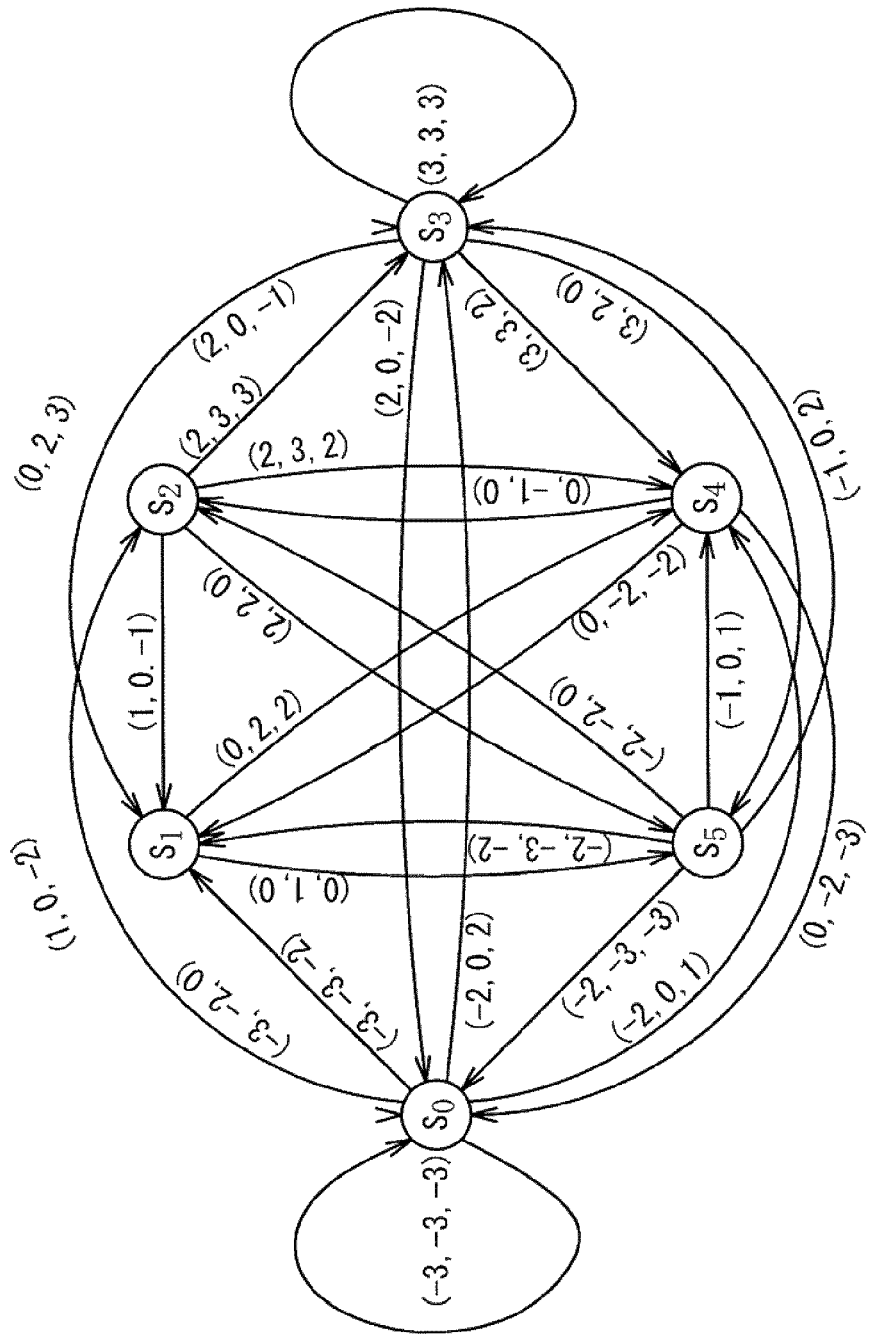
FIG. 8 is a state transition diagram for each 3T in a run length d=1 code, and PR (1,2,2,1) channel.

The state transition for every 1T of PR (1,2,2,1) channel in case of the shortest run length d=1 is in a 7-value 6 states, as shown in FIG. 7. In each state, there are two transition paths at maximum. However, the Viterbi detecting section 60 selects probably certain one of the two paths as an input path for every 1T. when tracing past paths, the paths connected in a time series are merged, and the detection data corresponding to the paths are outputted. In case of M=3, the state transition for every 3T should be considered, as shown in FIG. 8. In this state transition diagram, the number of the transition paths inputted to one state is 5 at maximum. However, probably certain one of the five input paths is selected for each 3T. After that, similarly, the detection data is outputted in a 3-bit unit in correspondence to the path-merged path.

Figure 9:
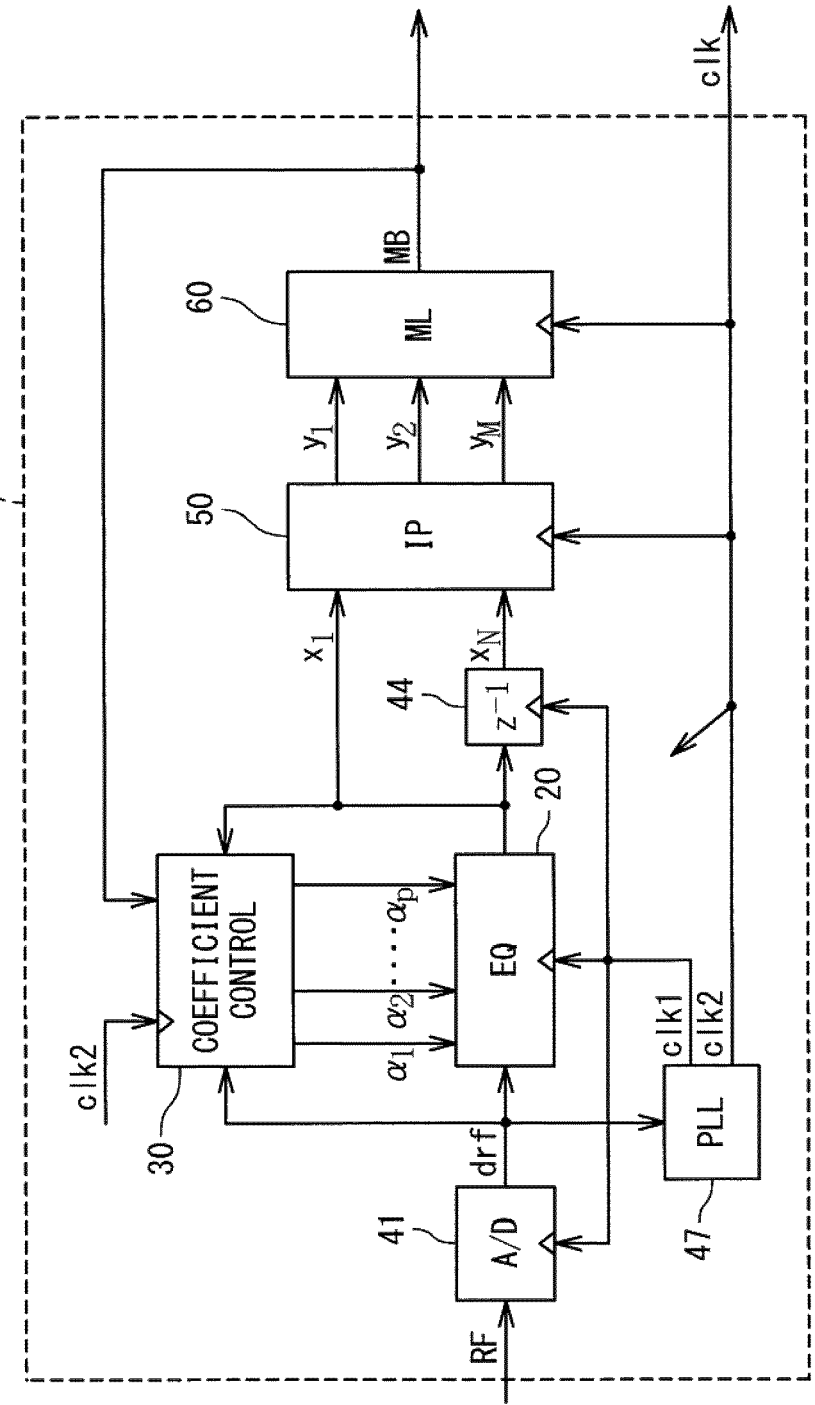
FIG. 9 is a block diagram showing a configuration of a reproduction data detecting section in which an adaptive equalizing section according to the exemplary embodiment of the present invention is provided.

FIG. 9 shows another configuration of the reproduction data detecting section 14. In this reproduction data detecting section 14, a coefficient control section 30 for controlling the coefficients of the equalizing section 20 is added to the configuration shown in FIG. 6. The coefficient control section 30 generates an equalization error-data in accordance with the detection data MB that is the output of the Viterbi detecting section 60 and the output $x_i$ of the equalizing section 20, and changes tap coefficients on the basis of correlation with the input drf of the equalizing section 20. The operation clock signal of the coefficient control section 30 has a frequency synchronous with the frequency fch/M. A timing at which the phase of the clock signal synchronous in the frequency fch (N/M) coincides with the phase of the clock signal synchronous in the frequency fch in the sampled data is one time per N periods. However, when the sufficient reproduction performance is obtained in initial values of the tap coefficients learned previously, the coefficient control section 30 is not always required, resulting in the configuration shown in FIG. 6. Moreover, when the sufficient characteristic is obtained only by the analog filter, the equalising section 20 is also unnecessary. Thus, the signal drf outputted from the AD converting section 41 may be directly connected to the interpolating section 50.

Figure 10:
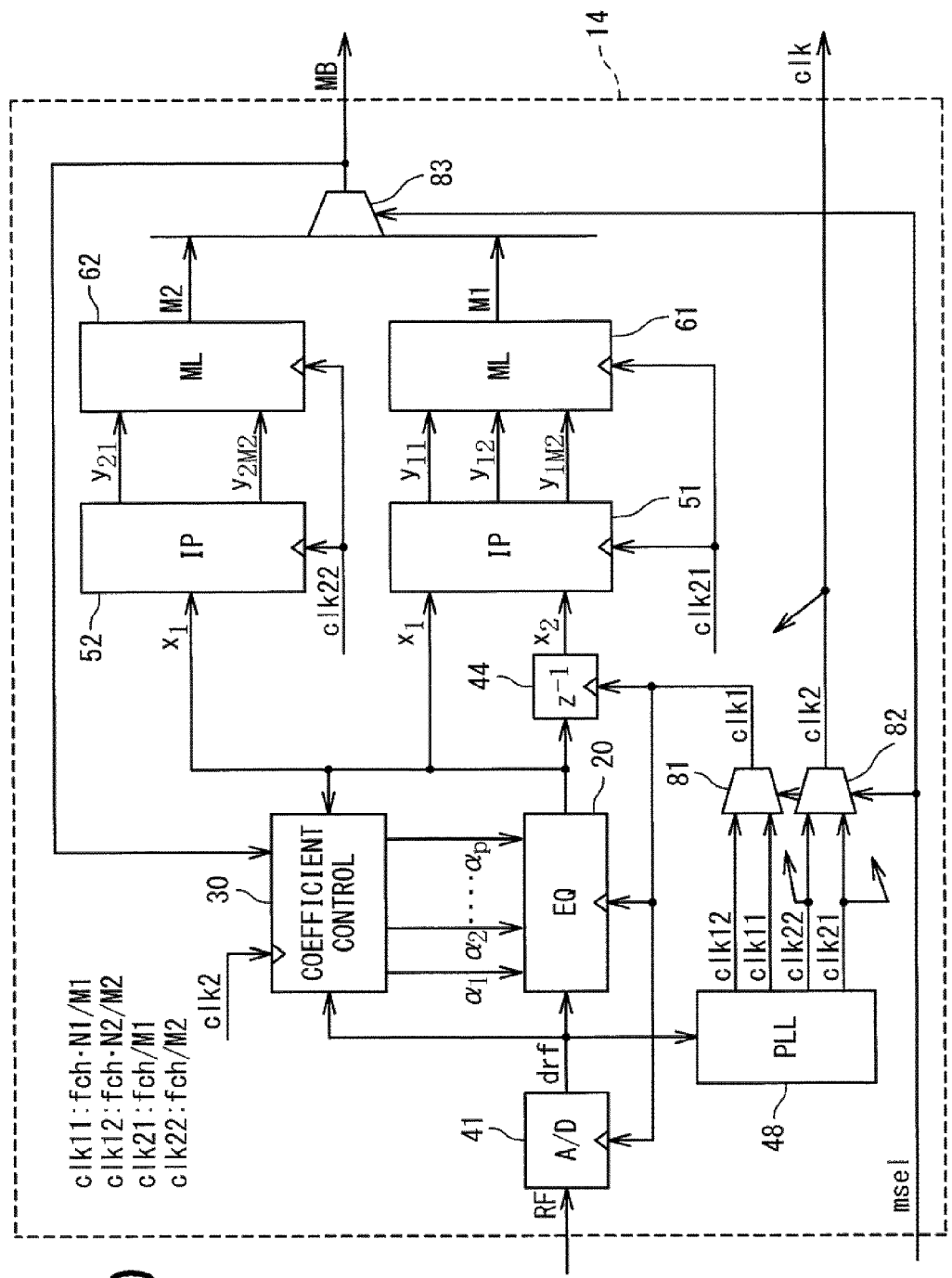
FIG. 10 is a block diagram showing a configuration of the reproduction data detecting section that can reproduce both of (N,M)=(2,3) and (N,M)=(1,2)

FIG. 10 shows another configuration of the reproduction data detecting section 14. In the reproduction data detecting section 14, both of the CD/DVD media and the next generation DVD media can be reproduced by a single information readout apparatus. The reproduction data detecting section 14 commonly contains the AD converting section 41, the equalizing section 20, the coefficient control section 30 and a PLL section 48, and contains an interpolating section 51 and a Viterbi detecting section 61 for the RLL code of the shortest run length d=1 and an interpolating section 52 and a Viterbi detecting section 62 for the RLL code of the shortest run length d=2. The outputs of the Viterbi detecting sections of two systems are selectively outputted by a selector 83. The d=1 system and the d=2 system exclusively operate. Thus, a configuration may be employed to reduce a power consumption amount by gating the clock signal in response to a media selection signal msel generated by the system control section 19.

The PLL section 48 outputs synchronization clock signals (clk11, clk12, clk21 and clk22) of four kinds. A frequency of the clock signal clk11 is defined as fch(N1/M1), and a frequency of the clock signal clk21 is defined as fch/M1, and they are the clock signals for the RLL code of the shortest run length d=1. A frequency of the clock signal clk12 is defined as fch(N2/M2), and a frequency of the clock signal clk22 is defined as fch/M2, and they are the clock signals for the RLL code of the shortest run length d=2. The readout signal for the RLL code of the shortest run length d=2 has a frequency characteristic lower than the channel frequency fch. Thus, N2/M2 is set to be smaller than N1/M1. In particular, (N1, M1)=(2,3) and (N2,M2)=(1,2) are proper. The set of the clock signal clk11 and the clock signal clk21 and the set of the clock signal clk12 and the clock signal clk22 may be exclusively outputted.

The AD converting section 41 and the equalizing section 20 operate at the clock signal selectively outputted by a selector 81. The selector 81 selects and outputs the clock signal clk11 in case of the shortest run length d=1 and the clock signal clk12 in case of the shortest run length d=2, A coefficient, control section 3 operates at the clock signal selected by a selector 82. The selector 82 selects and outputs the clock signal clk21 in case of the shortest run length d=1 and the clock signal clk22 in case of the shortest run length d=2.

In case of the shortest run length d=1, the interpolating section 51 and the Viterbi detecting section 61 operate, and the selector 83 validates and outputs the detection data of the Viterbi detecting section 61. In case of the shortest run length d=2, the interpolating section 52 and the Viterbi detecting section 62 operate, and the selector 83 validates and outputs the detection data of the Viterbi detecting section 62. Also, without any use of the interpolating section 52, the output of the equalizing section 20 may be directly supplied to the Viterbi detecting section 62. In this case, the Viterbi detection configuration is employed which is for detecting the data from the state transition of 2T periods. Also, the Viterbi detecting section 61 and the Viterbi detecting section 62 can be integrated, so as to reduce the circuit scale. Also, the values N and M may be changed in accordance with a kind of the media such as CD and DVD as well as a difference in the shortest run length d.

Figure 11:
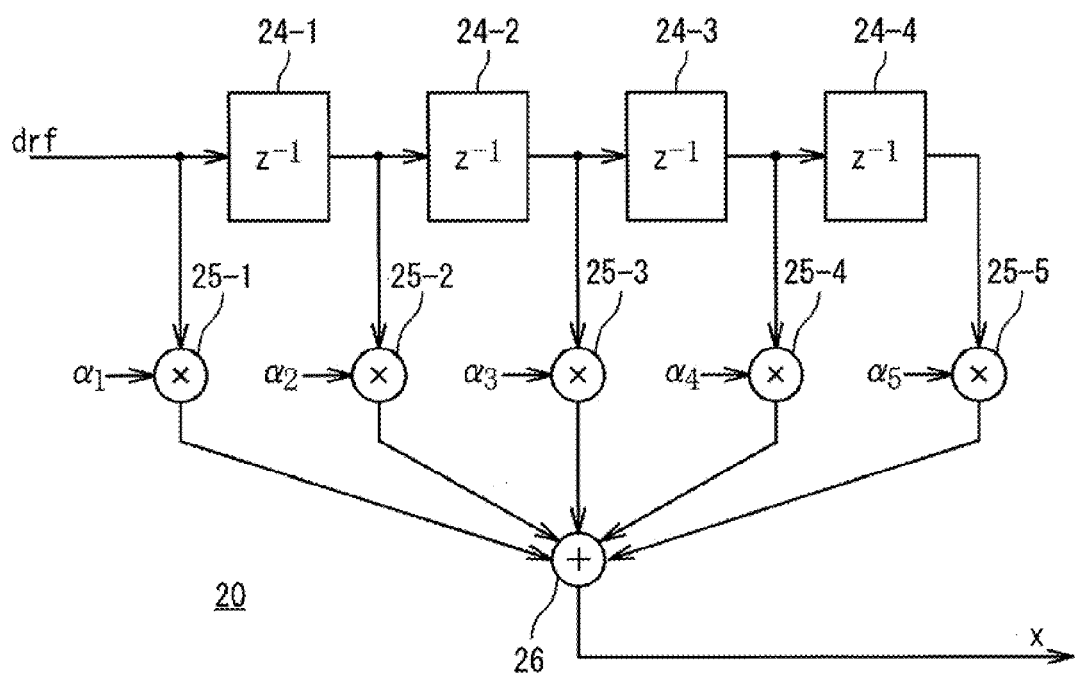
FIG. 11 is a block diagram showing an equalizing section.

FIG. 11 shows the configuration of the equalizing section 20. Here, the equalizing section 20 contains delay sections 24-1 to 24-4, multipliers 25-1 to 25-5 and an adder 26, and this is a typical 5-tap FIR filter. The number of the taps may be larger than 5. The difference from a usual filter is in that the delay amounts of the delay sections 24-1 to 24-4 are not a channel period T, and they are a period T(M/N) longer than it. An impulse response of convolution calculation by using the five tap coefficients of $\alpha_1$ to $\alpha_s$ is outputted. The respective tap coefficients are generated by the coefficient control section 30.

Figure 12:
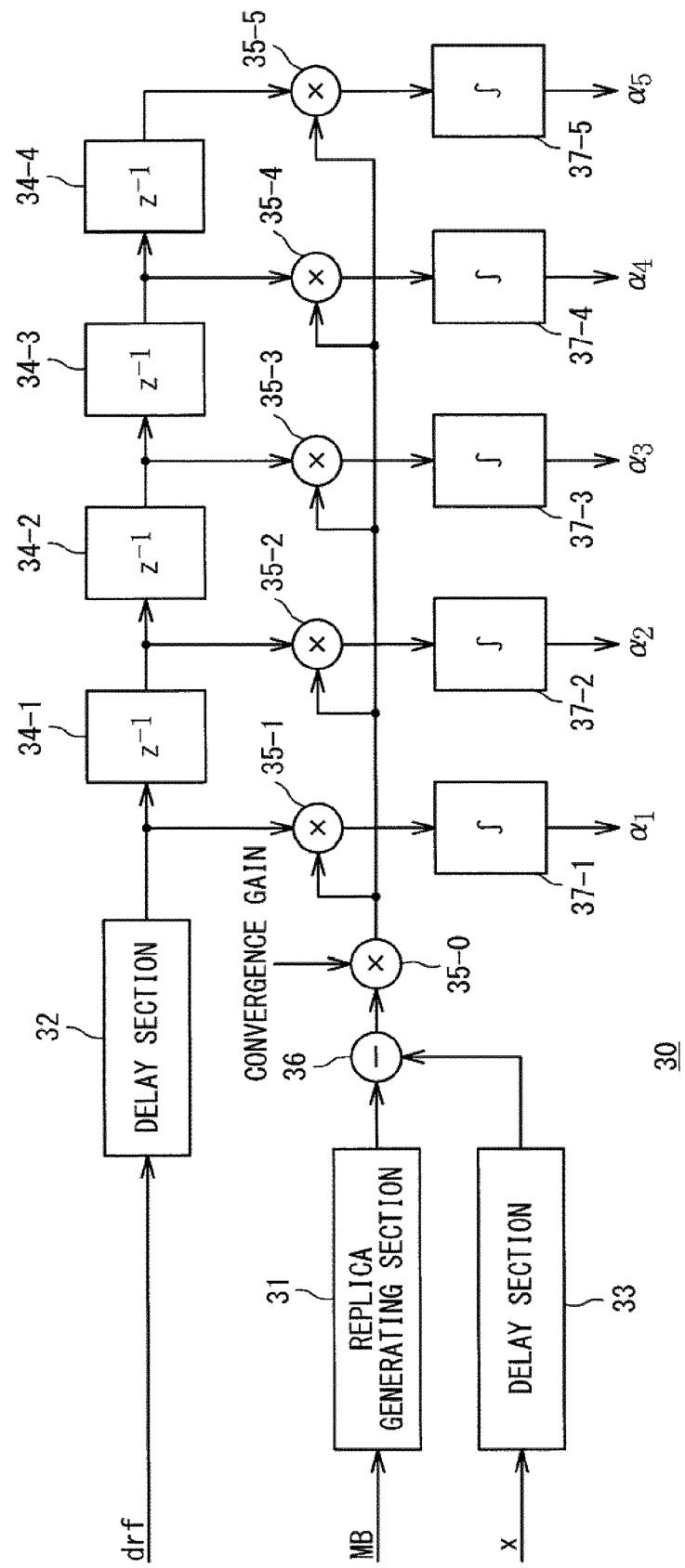
FIG. 12 is a block diagram showing a configuration of a coefficient control section.

FIG. 12 shows a configuration example of the coefficient control section 30. The coefficient control section 30 contains a replica generating section 31, a delay section 32, a delay section 33, delay sections 34-1 to 34-4, multipliers 35-0 to 35-5, a subtracting section 36 and integrating section 37-1 to 37-5. The replica generating section 31 convolutes the weight of a partial response on a signal MB that is an NRZI signal of a Viterbi detection result to generate a replica. A difference between the replica and an output x of the equalizing section 20 whose phase is matched by the delay section 32, namely, an equalization error is calculated by the subtracting section 36. In the coefficient control section 30, the multiplier 35-0 multiplies a convergence gain and the equalization error. Then, the correlation between the equalization error and the input drf of the equalising section 20 is calculated, and this correlation is fed back to the equalizing section 20 as the tap coefficients $\alpha_1$ to $\alpha_s$. In this way, an automatic operation is carried out such that the correlation between the equalization error and each tap is made as small as possible, and a desirable partial response equalization can be attained. That is, in the reproduction data detecting section 14, an LMS (Least Mean Square) configuration is employed in which a root mean square value of the equalization errors becomes minimum. The replica generating section 31 may be configured such that the weight of the partial response can be changed in order to be able to change a class of PR.

By the way, when a record mark smaller than a light spot is reproduced, an inter-code interference amount increases. This implies that the independence between the taps becomes small, which implies that the convergence of the tap coefficients becomes bad at the time of the automatic equalization. In the present invention, since the tap interval is longer than the channel clock signal period, the independence between the taps becomes high, which makes the convergence of the coefficients faster. Simultaneously, even if the number of the taps is small, the similar performance is obtained.

Figure 13:
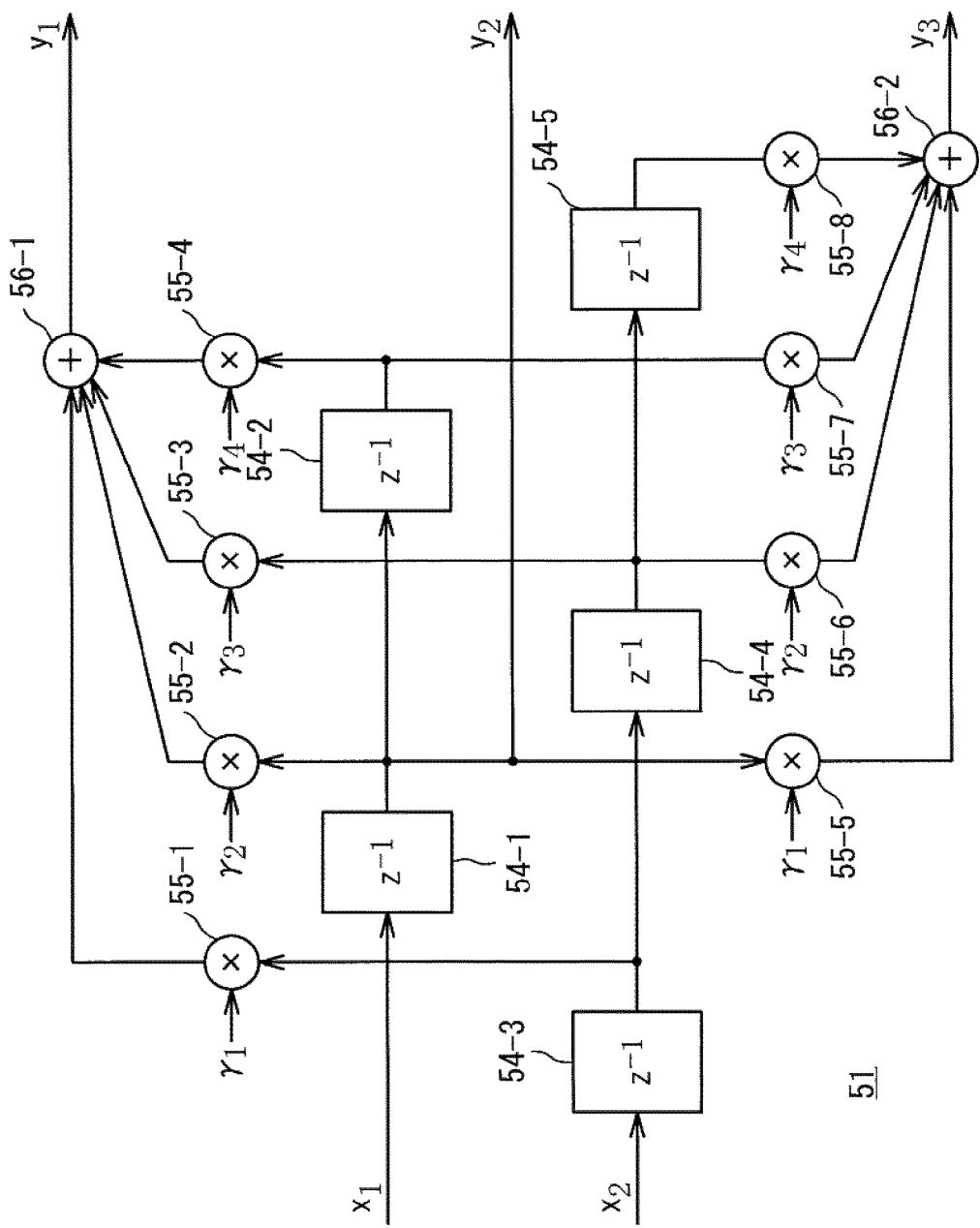
FIG. 13 is a block diagram showing a configuration of an interpolating section.

FIG. 13 shows a configuration example of the interpolating section 51 (or 50) for the shortest run length d=1. The interpolating section 51 contains delay sections 54-1 to 54-5, multipliers 55-1 to 55-8 and adders 56-1 to 56-2. In the interpolating section 51, RF data for each 1.5T is read in two parallel rows ($x_1$, $x_2$) for each 3T. Then, two interpolation filters generate a sample data $y_s$ delayed by 1T and a sample data $y_1$ advanced by 1T with respect to an output $y_2$. The first interpolation filter contains the delay sections 54-1 to 54-4, the multipliers 55-1 to 55-4 and the adder 56-1 and generates the output $y_1$. The second interpolation filter contains the delay sections 54-1 to 54-2 and 54-4 to 54-5, the multipliers 55-5 to 55-8 and the adder 56-2 and generates the output $y_3$. As the number of filter stage increases, the LPF having a sharper attenuation rate can be configured. However, from the viewpoint of the circuit scale, the four to six taps are proper.

The operation of the information readout apparatus according to this exemplary embodiment will be described below with reference to FIG. 14. FIG. 14 shows the operation waveforms when a 4T-mark 4T-space continuation pattern is reproduced in (N,M)=(2,3). (a) of FIG. 14 shows a synchronous clock signal clk1 (period: 1.5T) of a frequency equal to 2/3 times of the channel frequency. (b) of FIG. 14 shows an output drf of the AD converting section 41 in which an RF signal is sampled with the synchronization clock signal (1.5T) having a frequency equal to 2/3 times of the channel frequency. (c) of FIG. 14 shows a waveform of a signal $x_1$ obtained by waveform equalizing the signal drf by the equalizing section 20, (d) of FIG. 14 shows a waveform of a signal $x_2$ obtained by delaying the signal $x_1$ by one period (1.5T). The signals $x_1$ and $x_2$ are subjected to an interpolating process by the interpolating section 50 (51) operating at a 1/3 synchronization clock signal. Then, the 3-parallel 1T sample data $y_3$, $y_3$ and $y_1$ are generated as shown in (f) to (h) of FIG. 14. As for this three data sequence, the data is outputted for each 3 bits by the Viterbi detecting section 60 (61) of 3-parallel input. Thus, as shown in (i) of FIG. 14, the 3-bit data is outputted at the 3T period.

In this way, the circuit system operates at the frequency lower than the channel clock signal. Thus, even if the RLL code of the shortest run length d=1 is used, the circuit scale and the power consumption amount can be reduced without any reduction in the reproduction performance. Also, in the PR class suitable for the high density, since the constraint length is long, the correlation between the adjacent taps is strong. Thus, as the tap interval is longer than 1T, the convergence becomes faster, which makes the convergence of the adaptive equalizing section can be made fast. The present invention is preferable for the optical disc apparatus in which the high density recording is carried out at the record code of the shortest run length d=1 and can be used for the reproduction from CD/DVD.

As mentioned above, the present invention has been described by referring to the exemplary embodiment. However, the present invention is not limited to the exemplary embodiments. The various changes that can be understood by one skilled in the art within the scope of the present invention can be performed on the configurations and details of the present invention.

The invention claimed is:

1. An information readout apparatus comprising:
an analog to digital converting section configured to convert a read signal read out from an optical disc medium into a digital signal, and outputting the digital signal in synchronous with a first clock signal with a frequency which is N/M times of a channel frequency contained in said read signal, wherein data is recorded on said optical disc medium with run length limited code when the shortest run length is 1, and N is an integer equal to or more than 2 and M is an integer meeting N/M>0.5;
an equalizing section configured to equalize said digital signal to a previously specified partial response (PR) characteristic in synchronous with said first clock signal signal;
an interpolating section configured to convert N input data outputted from said equalizing means into M output data, and outputting the output data in synchronous with a second clock signal with a frequency of 1/M times of said channel frequency;
a maximum likelihood detecting section configured to convert the output data outputted from said interpolation means into an M-bit detection data, and outputting said detection data in synchronous with said second clock signal signal; and
a PLL section configured to generate said first clock signal and said second clock signal based on said read signal.

2. The information readout apparatus according to claim 1, wherein said interpolating section inputs said N input data in parallel and outputs said M output data in parallel, and
said maximum likelihood detecting section configured to output said M-bit detection data in parallel.

3. The information readout apparatus according to claim 1, wherein said equalizing section comprises:
a FIR filter having variable tap coefficients and operating in synchronous with said first clock signal signal; and
a coefficient control section for setting said tap coefficients in synchronous with said second clock signal signal,
wherein said coefficient control section sets said tap coefficients such that an equalization error generated based on said detection data and an output of said FIR filter is minimized.

4. The information readout apparatus according to claim 1 wherein N=2 and M=3.

5. An information readout apparatus comprising:
an analog to digital converting section configured to convert a read signal read out from an optical disc medium into a digital signal, and outputting the digital signal in synchronous with a sampling clock signal signal, wherein data is recorded on said optical disc medium with run length limited code when N1 is an integer equal to or more than 2, M1 is an integer meeting N1/M1>0.5, N2 is an integer equal to or more than 1, M2 is an integer meeting N2<M2 and N2×M1<M ×N1;
a PLL section configured to generate a first clock signal of a frequency of N1/M1 times of a channel frequency of said read signal, a second clock signal of a frequency of 1/M1 time of said channel frequency, a third clock signal of a frequency of N2/M2 times of said channel frequency, and a fourth clock signal of a frequency of 1/M2 times of said channel frequency based on said digital signal;
an equalizing section configured to output an equalization signal obtained by equalizing said digital signal into a partial response characteristic specified previously in synchronous with said sampling clock signal signal;
an interpolating section configured to input said equalization signal for N1 phases in parallel and outputting and interpolation signal interpolated for every channel frequency for M1 phases in parallel, wherein said interpolation signal is outputted in synchronous with said second clock signal signal;
a maximum likelihood detecting section configured to select a maximum likelihood state transition based on said interpolation signal to detecting a first data sequence, and outputting said first data sequence as detection data for every period of said second clock signal for M1 bits in parallel; and
a data detecting section configured to input said equalization signal for N2 phases in parallel to detect a second data sequence, and outputting said second data sequence as said detection data for every four periods of said fourth clock signal for M2 bits in parallel,
wherein said sampling clock signal is said first clock signal when reading said read signal from said optical disc medium on which data is recorded with run length limited code that the shortest run length is 1, and said third clock signal when reading said read signal from said optical disc medium on which data is recorded with run length limited code that the shortest run length is 2.

6. The information readout apparatus according to claim 5, wherein said equalizing section operates based on said sampling clock signal signal,
said interpolating section and said maximum likelihood detecting section operate in synchronous with said second clock signal signal, and
said data detecting section operates in synchronous with said fourth clock signal signal.

7. The information readout apparatus according to claim 5, further comprising:
a selector for selecting said first data sequence or said second data sequence to output as said detection data,
wherein said equalizing section comprises:
an FIR filter having settable tap coefficients; and
a coefficient control section for settings said tap coefficients such that an equalization error generated based on said detection data and an output of said FIR filter is minimized,
when said shortest run length is 1, said selector selects said first data sequence as said detection data, said FIR filter operates in synchronous with said first clock signal and said coefficient control section operates in synchronous with said second clock signal signal, and
when said shortest run length is 2, said selector selects said second data sequence as said detection data, said FIR filter operates in synchronous with said third clock signal and said coefficient control section operates in synchronous with said four clock signal signal.

8. The information readout apparatus according to claim 5, wherein N1=2, M1=3, N2=1, and M2=2.

9. An information readout apparatus comprising:
an analog to digital converting section configured to convert a read signal reproduced from an optical disk medium on which data is recorded in run length limited code that the shortest run length is 1, and containing a data sequence which has a limited state transition into a digital signal, and generating an input data sequence when N is an integer equal to or more than 2 and M is an integer meeting N/M>0.5;

an interpolating section configured to interpolate N input data of said input data sequence, and outputting M interpolation data; and a maximum likelihood detecting section configured to select the maximum likelihood state transition based on said M interpolation data and outputting said data sequence.

10. The information readout apparatus according to claim 9, further comprising:

a PLL section configured to generate a first clock signal of a frequency of N/M times of a channel frequency which is contained in said read signal, and a second clock signal of a frequency of 1/M times of said channel frequency, wherein said analog to digital converting section outputs said input data in synchronous with said first clock signal signal, said interpolating section outputs said interpolation data in synchronous with said second clock signal signal, said maximum likelihood detecting section outputs said data sequence in synchronous with said second clock signal signal.

11. The information readout apparatus according to claim 9, wherein said analog to digital converting section comprises:

A/D converting section for converting said read signal into said digital signal; and an equalizing section configured to equalize said digital signal to a partial response (PR) characteristic specified previously.

12. The information readout apparatus according to claim 11, wherein said equalizing section comprises an FIR filter with settable tap coefficients, and said analog to digital converting section comprises a coefficient control section which sets the tap coefficients of said FIR filter circuit.

13. The information readout apparatus according to claim 12, wherein said FIR filter operates in synchronous with said first clock signal signal, and said coefficient control section operates in synchronous with said second clock signal signal.

14. The information readout apparatus according to claim 9, wherein N=2, and M=3.

15. An information reproducing method comprising:

converting a read signal read out from an optical disc medium into a digital signal, and outputting the digital signal in synchronous with a first clock signal with a frequency of N/M times of a channel frequency of said read signal, wherein data is recorded on said optical disc medium with run length limited code when a shortest run length is 1, and N is an integer equal to or more than 2 and M is an integer meeting N/M>0.5;

equalizing said digital signal to a previously specified partial response (PR) characteristic in synchronous with said first clock signal signal;

converting N input data obtained in said equalization into M output data. to output the output data in synchronous with a second clock signal with a frequency of 1/M times of said channel frequency;

converting the output data obtained in said interpolation into an M-bit detection data, to output said detection data in synchronous with said second clock signal signal; and generating said first clock signal and said second clock signal based on said read signal.

16. The information reproducing method according to claim 15, wherein said equalizing comprises:

an FIR filter filtering said digital signal with variable tap coefficients in synchronous with said first clock signal; and setting said tap coefficients to said FIR filter in synchronous with said second clock signal signal, said setting comprises:

calculating an equalization error based on an filter output from said FIR filter and said detection data; and setting said tap coefficients such the equalization error becomes minimum.

17. The information reproducing method according to claim 15, wherein N=2, and M=3.

* * * * *